United States Patent
Keshwani

(10) Patent No.: US 12,190,556 B2
(45) Date of Patent: Jan. 7, 2025

(54) LEARNING APPARATUS, LEARNING METHOD, AND LEARNING PROGRAM, GRAPH STRUCTURE EXTRACTION APPARATUS, GRAPH STRUCTURE EXTRACTION METHOD, AND GRAPH STRUCTURE EXTRACTION PROGRAM, AND LEARNED EXTRACTION MODEL

(71) Applicant: FUJIFILM Corporation, Tokyo (JP)

(72) Inventor: Deepak Keshwani, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 428 days.

(21) Appl. No.: 17/581,836

(22) Filed: Jan. 21, 2022

(65) Prior Publication Data

US 2022/0148286 A1 May 12, 2022

Related U.S. Application Data

(63) Continuation of application No. PCT/JP2020/028416, filed on Jul. 22, 2020.

(30) Foreign Application Priority Data

Jul. 25, 2019 (JP) ................................. 2019-137034

(51) Int. Cl.
*G06V 10/426* (2022.01)
*G06V 10/774* (2022.01)
(Continued)

(52) U.S. Cl.
CPC .......... *G06V 10/426* (2022.01); *G06V 10/774* (2022.01); *G06V 10/82* (2022.01); *G06V 10/98* (2022.01); *G06V 2201/03* (2022.01)

(58) Field of Classification Search
CPC ...... G06V 10/426; G06V 10/82; G06V 10/98; G06V 10/774; G06V 2201/03
See application file for complete search history.

(56) References Cited

U.S. PATENT DOCUMENTS

2010/0296709 A1 11/2010 Ostrovsky et al.
2022/0044767 A1* 2/2022 Rong .................. G06F 18/29

FOREIGN PATENT DOCUMENTS

EP           1271391 A1 *  1/2003  ........... G06K 9/2054
JP        2014236912        12/2014
(Continued)

OTHER PUBLICATIONS

Bert De Brabandere et al., "Semantic Instance Segmentation with a Discriminative Loss Function," workshop at CVPR 2017, Aug. 2017, pp. 1-10.
(Continued)

*Primary Examiner* — John J Lee
(74) *Attorney, Agent, or Firm* — JCIPRNET

(57) ABSTRACT

A learning unit derives, from a target image including at least one tubular structure, in a case where an image for learning and ground-truth data of a graph structure included in the image for learning are input to an extraction model which extracts a feature vector of a plurality of nodes constituting a graph structure of the tubular structure, a loss between nodes on the graph structure included in the image for learning on the basis of an error between a feature vector distance between nodes belonging to the same graph structure and a topological distance which is a distance on a route of the graph structure between the nodes, and performs learning of the extraction model on the basis of the loss.

14 Claims, 7 Drawing Sheets

(51) Int. Cl.
*G06V 10/82* (2022.01)
*G06V 10/98* (2022.01)

(56) References Cited

FOREIGN PATENT DOCUMENTS

| JP | 2014236912 A | * | 12/2014 | ............... A61B 6/00 |
|---|---|---|---|---|
| WO | 2017199246 | | 11/2017 | |
| WO | WO-2017199246 A1 | * | 11/2017 | ............. A61B 6/504 |

OTHER PUBLICATIONS

Alireza Fathi et al., "Semantic Instance Segmentation via Deep Metric Learning," Computer Vision and Pattern Recognition, Mar. 2017, pp. 1-9.

Shu Kong et al., "Recurrent Pixel Embedding for Instance Grouping," Computer Vision and Pattern Recognition (cs.CV); Machine Learning(cs.LG); Multimedia (cs.MM), Dec. 2017, pp. 1-24.

Rossant Florence et al., "A Morphological Approach for Vessel Segmentation in Eye Fundus Images, with Quantitative Evaluation," Journal of Medical Imaging and Health Information, vol. 1, 2011, pp. 42-49.

Andrzej Szymczak et al., "Coronary vessel trees from 3D imagery: A topological approach," Medical Image Analysis, vol. 10, Aug. 2006, pp. 1-24.

Reza Nekovei et al., "Back Propagation Network and its Configuration for Blood Vessel Detection in Angiograms," IEEE Transactions on Neural Networks, vol. 6, Jan. 1995, pp. 64-72.

"International Search Report (Form PCT/ISA/210) of PCT/JP2020/028416," mailed on Sep. 15, 2020, with English translation thereof, pp. 1-6.

"Written Opinion of the International Searching Authority (Form PCT/ISA/237)" of PCT/JP2020/028416, mailed on Sep. 15, 2020, with English translation thereof, pp. 1-6.

"Search Report of Europe Counterpart Application", issued on Jul. 18, 2022, p. 1-p. 9.

Ruben Hemelings et al., "Artery-vein segmentation in fundus images using a fully convolutional network," Computerized Medical Imaging and Graphics, vol. 76, May 2019, pp. 1-12.

Fantin Girard et al., "Joint segmentation and classification of retinal arteries/veins from fundus images," arXiv.org, Mar. 2019, pp. 1-15.

"Notice of Reasons for Refusal of Japan Counterpart Application", issued on Nov. 8, 2022, with English translation thereof, p. 1-p. 4.

* cited by examiner

LEARNING APPARATUS, LEARNING METHOD, AND LEARNING PROGRAM, GRAPH STRUCTURE EXTRACTION APPARATUS, GRAPH STRUCTURE EXTRACTION METHOD, AND GRAPH STRUCTURE EXTRACTION PROGRAM, AND LEARNED EXTRACTION MODEL

CROSS REFERENCE TO RELATED APPLICATIONS

The present application is a Continuation of PCT International Application No. PCT/JP2020/028416, filed on Jul. 22, 2020, which claims priority to Japanese Patent Application No. 2019-137034, filed on Jul. 25, 2019. Each application above is hereby expressly incorporated by reference, in its entirety, into the present application.

BACKGROUND

Technical Field

The present disclosure relates to a learning apparatus, a learning method, and a learning program that perform learning of an extraction model which is used to extract a graph structure included in an image, a graph structure extraction apparatus, a graph structure extraction method, and a graph structure extraction program that extract a graph structure included in an image, and a learned extraction model.

Related Art

In recent years, machine learning techniques using deep learning have been attracting attention. In particular, various techniques have been proposed in the field of class classification for identifying objects included in an image. For example, semantic segmentation is well-known in which class classification is performed by labeling all pixels of the image on a pixel-by-pixel basis. However, since semantic segmentation performs segmentation without distinguishing individual objects of the same category, it is not possible to distinguish individual objects in a case where objects of the same category overlap. Therefore, an instance segmentation method of distinguishing and segmenting individual objects has been proposed (see, for example, Semantic Instance Segmentation with a Discriminative Loss Function, Bert De Brabandere, Davy Neven, Luc Van Gool, Computer Vision and Pattern Recognition, "Deep Learning for Robotic Vision", workshop at CVPR 2017, Submitted on 8 Aug. 2017, Semantic Instance Segmentation via Deep Metric Learning, Alireza Fathi, Zbigniew Wojna, Vivek Rathod, Peng Wang, Hyun Oh Song, Sergio Guadarrama, Kevin P. Murphy, Computer Vision and Pattern Recognition, Submitted on 30 Mar. 2017, and Recurrent Pixel Embedding for Instance Grouping, Shu Kong, Charless Fowlkes, Computer Vision and Pattern Recognition (cs.CV); Machine Learning (cs.LG); Multimedia (cs.MM), Submitted on 22 Dec. 2017). In a case where the instance segmentation is used, individual objects can be distinguished and segmented even in a case where the objects are in the same category. Therefore, the objects can be individually segmented even in a case where the objects of the same category overlap.

SUMMARY

Meanwhile, in the medical field, simulation of surgery on a tubular structure, such as a blood vessel and a bronchus, or analysis of the tubular structure has been performed by using a medical image. In order to perform such simulation, analysis, or the like, it is necessary to extract a graph structure of the tubular structure from the medical image. In this case, for example, individual objects of the same category, which constitute the tubular structure, are distinguished and segmented by the above-described instance segmentation method, and then a continuous point is connected from an origin point of the graph by using, for example, a similarity function, so that the graph structure can be extracted.

However, in a case where the similarity function is used, the graph structure may not be continuously connected along the tubular structure at a branch position of the graph. In particular, in a case where the tubular structure is an artery and a vein, and the artery and the vein intersect each other on the image, it may be difficult to distinguish and connect the artery and the vein.

The present disclosure has been made in view of the above circumstances, and an object thereof is to make it possible to accurately extract a graph structure included in an image.

A learning apparatus according to the present disclosure comprises a learning unit that derives, from a target image including at least one tubular structure, in a case where an image for learning and ground-truth data of a graph structure included in the image for learning are input to an extraction model which extracts a feature vector of a plurality of nodes constituting a graph structure of the tubular structure, a loss between nodes on the graph structure included in the image for learning on the basis of an error between a feature vector distance between nodes belonging to the same graph structure and a topological distance which is a distance on a route of the graph structure between the nodes, and that performs learning of the extraction model on the basis of the loss.

The graph structure is a linear structure extending in a length direction of the tubular structure such as a blood vessel and a bronchus. The graph structure represents a shape of the tubular structure. Nodes are points that exist on the graph structure and that constitute the graph structure.

The "topological distance" is a distance on the graph structure, between nodes in the same graph structure. For example, in a case where the graph structure forms an arc, the Euclidean distance between the two points on the arc is a straight line connecting the two points, that is, a length of a chord, but the topological distance between the two points on the arc is a route between the two points on the graph structure, that is, a length of the arc connecting the two points.

In the learning apparatus according to the present disclosure, the learning unit may further derive, for an image for learning including at least two different graph structures, the loss such that a feature vector distance between nodes belonging to the same graph structure in the image for learning is decreased.

Further, in the learning apparatus according to the present disclosure, the learning unit may further derive the loss such that a feature vector distance between nodes belonging to different graph structures is increased.

Further, in the learning apparatus according to the present disclosure, the extraction model may be a fully convolutional neural network.

Further, in the learning apparatus according to the present disclosure, the target image and the image for learning may be three-dimensional medical images.

Further, in the learning apparatus according to the present disclosure, the tubular structure may be an artery and a vein.

Further, in the learning apparatus according to the present disclosure, the tubular structure may be an artery, a vein, and a portal vein in a liver.

Further, in the learning apparatus according to the present disclosure, the tubular structure may be a bronchus.

A graph structure extraction apparatus according to the present disclosure comprises an extraction unit that outputs an extraction result of a graph structure included in the target image, in response to an input of the target image, in which the extraction model learned by the learning apparatus according to the present disclosure is applied.

In the graph structure extraction apparatus according to the present disclosure, a labeling unit that labels the tubular structure included in the target image according to the extraction result of the graph structure, and a display control unit that displays the target image in which the tubular structure is labeled, on a display unit may further be provided.

A learned extraction model according to the present disclosure comprises the extraction model learned by the learning apparatus according to the present disclosure.

A learning method according to the present disclosure comprises: deriving, from a target image including at least one tubular structure, in a case where an image for learning and ground-truth data of a graph structure included in the image for learning are input to an extraction model which extracts a feature vector of a plurality of nodes constituting a graph structure of the tubular structure, a loss between nodes on the graph structure included in the image for learning on the basis of an error between a feature vector distance between nodes belonging to the same graph structure and a topological distance which is a distance on a route of the graph structure between the nodes; and performing learning of the extraction model on the basis of the loss.

A graph structure extraction method according to the present disclosure comprises outputting an extraction result of a graph structure included in the target image, in response to an input of the target image, in which the extraction model learned by the learning method according to the present disclosure is applied.

The learning method and the graph structure extraction method according to the present disclosure may be provided as programs to be executed by a computer.

Another learning apparatus according to the present disclosure comprises: a memory that stores a command to be executed by a computer; and a processor configured to execute the stored command, in which the processor executes a process including deriving, from a target image including at least one tubular structure, in a case where an image for learning and ground-truth data of a graph structure included in the image for learning are input to an extraction model which extracts a feature vector of a plurality of nodes constituting a graph structure of the tubular structure, a loss between nodes on the graph structure included in the image for learning on the basis of an error between a feature vector distance between nodes belonging to the same graph structure and a topological distance which is a distance on a route of the graph structure between the nodes; and performing learning of the extraction model on the basis of the loss.

Another graph structure extraction apparatus according to the present disclosure comprises: a memory that stores a command to be executed by a computer; and a processor configured to execute the stored command, in which the processor executes a process including outputting an extraction result of a graph structure included in the target image, in response to an input of the target image, in which a learned extraction model including the extraction model learned by the learning method according to the present disclosure is applied.

According to the present disclosure, a graph structure can be accurately extracted from a target image.

DETAILED DESCRIPTION

Figure 1:
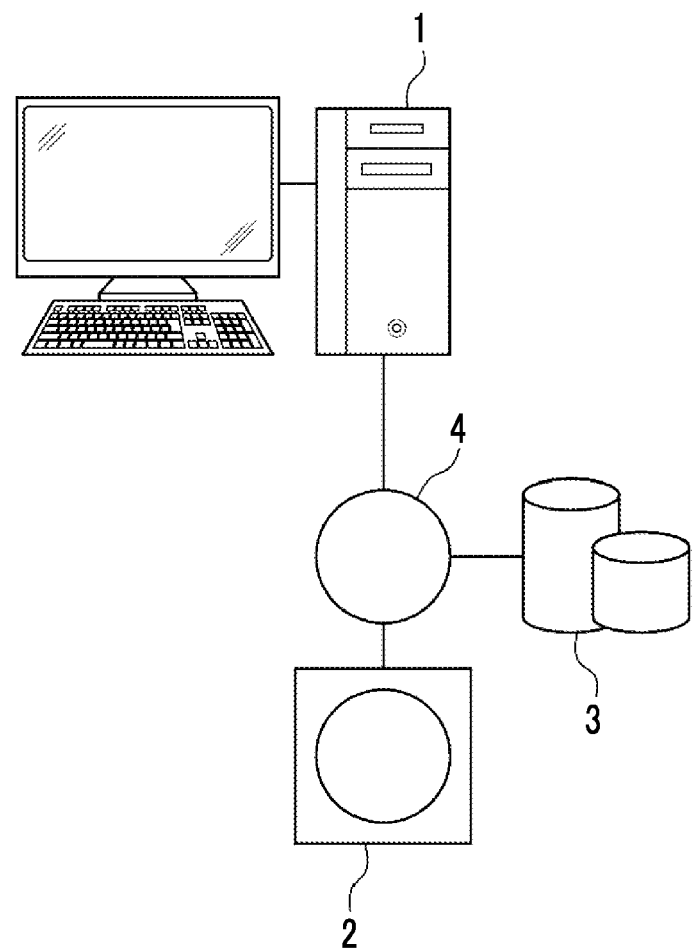
FIG. 1 is a hardware configuration diagram showing an outline of a diagnosis support system to which a learning apparatus and a graph structure extraction apparatus according to an embodiment of the present disclosure are applied.

Hereinafter, an embodiment of the present disclosure will be described with reference to the drawings. FIG. 1 is a hardware configuration diagram showing an outline of a diagnosis support system to which a learning apparatus and a graph structure extraction apparatus according to an embodiment of the present disclosure are applied. As shown in FIG. 1, in the diagnosis support system, a learning apparatus and graph structure extraction apparatus (hereinafter, simply referred to as a graph structure extraction apparatus) 1, a three-dimensional image capturing apparatus 2, and an image storage server 3 according to the present embodiment are connected to communicate with one another via a network 4.

The three-dimensional image capturing apparatus 2 is an apparatus that images an area to be diagnosed of a subject and that generates a three-dimensional medical image representing the area, and specific examples thereof include a CT apparatus, an MRI apparatus, and a positron emission tomography (PET) apparatus. The three-dimensional image generated by the three-dimensional image capturing apparatus 2 is transmitted to and stored on the image storage server 3. In the present embodiment, the three-dimensional image capturing apparatus 2 is a CT apparatus and generates a CT image including the area to be diagnosed of the subject, as a three-dimensional image. In addition, the three-dimensional image consists of a plurality of tomographic images. Further, in the present embodiment, the subject is a liver of a human body, and graph structures of an artery and a vein included in the liver are an extraction target.

The image storage server 3 is a computer that stores and manages various data and comprises a large-capacity external storage device and database management software. The image storage server 3 communicates with another apparatus via a wired or wireless network 4 to transmit and receive image data and the like. Specifically, the image storage server 3 acquires various data including the image data of the three-dimensional image generated by the three-dimensional image capturing apparatus 2 via the network, and stores and manages the acquired data on a recording medium such as a large-capacity external storage device. A storage format of the image data and the communication between the apparatuses via the network 4 are based on a protocol such as digital imaging and communication in medicine (DICOM). Further, in the present embodiment, the image storage server 3 also stores and manages an image for learning that is used to perform learning of an extraction model, which will be described later.

The graph structure extraction apparatus 1 including the learning apparatus of the present embodiment is an apparatus in which a learning program and a graph structure extraction program of the present embodiment are installed on one computer. The computer may be a workstation or a personal computer directly operated by a doctor who makes diagnosis, or may be a server computer connected to the workstation or the personal computer via a network. The learning program and the graph structure extraction program are stored on a storage device of a server computer connected to the network or on network storage so as to be accessible from the outside, and are downloaded and installed on a computer that the doctor uses according to a request. Alternatively, the learning program and the graph structure extraction program are recorded on a recording medium, such as a digital versatile disc (DVD) or a compact disc read only memory (CD-ROM), and are distributed and installed on a computer from the recording medium.

Figure 2:
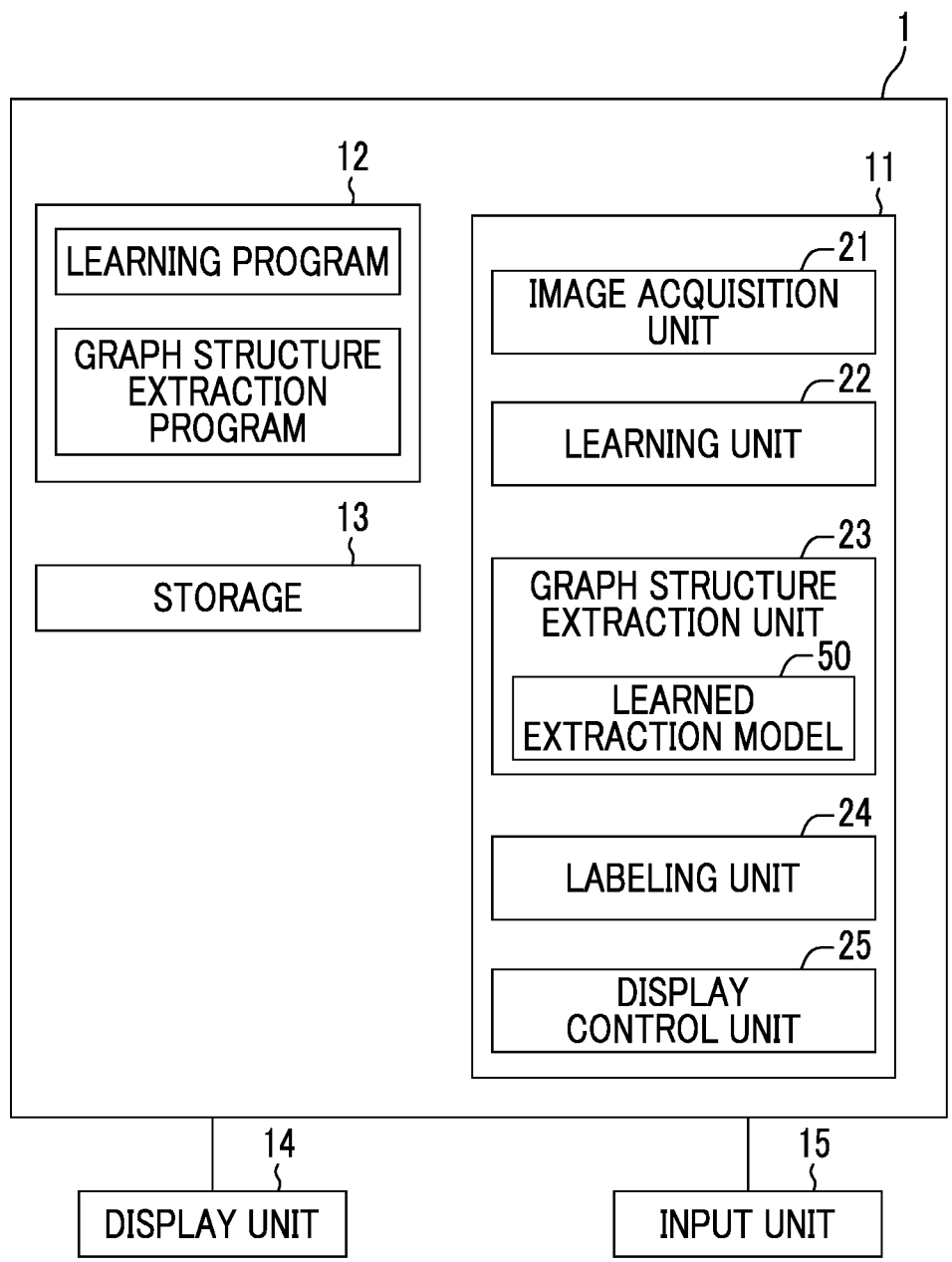
FIG. 2 is a diagram showing a schematic configuration of the graph structure extraction apparatus according to the embodiment of the present disclosure.

FIG. 2 is a diagram showing the schematic configuration of the graph structure extraction apparatus which is realized with the learning program and the graph structure extraction program installed on a computer. As shown in FIG. 2, the graph structure extraction apparatus 1 comprises a central processing unit (CPU) 11, a memory 12, and a storage 13, as a standard workstation configuration. Further, a display unit 14, such as a liquid crystal display, and an input unit 15, such as a keyboard and a mouse, are connected to the graph structure extraction apparatus 1.

The storage 13 includes a hard disk drive or the like, and stores a target image as a graph structure extraction target, which is acquired from the image storage server 3 via the network 4, an image for learning that is used to perform learning of the neural network, which will be described later, and various information including information required for processing.

Further, the learning program and the graph structure extraction program are stored on the memory 12. As processing to be executed by the CPU 11, the learning program defines image acquisition processing of acquiring an image for learning that is used to perform learning of an extraction model, which will be described later, and a target image as a graph structure extraction target, and learning processing of deriving a loss that is used to perform learning of the extraction model and performing learning of the extraction model on the basis of the loss.

As processing to be executed by the CPU 11, the graph structure extraction program defines graph structure extraction processing of outputting an extraction result of a graph structure included in the target image as a graph structure extraction target, which is acquired by the image acquisition processing, labeling processing of labeling a tubular structure (in the present embodiment, an artery and a vein) included in the target image according to the extraction result of the graph structure, and display control processing of displaying the labeled target image on the display unit 14.

The CPU 11 executes the processing in accordance with the learning program and the graph structure extraction program, so that the computer functions as an image acquisition unit 21, a learning unit 22, a graph structure extraction unit 23, a labeling unit 24, and a display control unit 25.

The image acquisition unit 21 acquires, as the target image, the three-dimensional image including the graph structure, from the image storage server 3 via an interface (not shown) connected to the network. In the present embodiment, a three-dimensional image of the liver including an artery and a vein as a tubular structure is used as the target image. The blood vessels of the liver also include a portal vein in addition to the artery and the vein, but here, for the sake of explanation, only the artery and vein will be described. The image acquisition unit 21 also acquires an image for learning that is used to perform learning and ground-truth data, which will be described later.

The learning unit 22 performs learning of an extraction model that extracts, from the target image including at least one tubular structure (in the present embodiment, two tubular structures of an artery and a vein), a feature vector of a plurality of nodes constituting a graph structure of the tubular structure. Specifically, the learning unit 22 performs learning of the extraction model so that the extraction model outputs a feature map in which a feature vector distance between nodes belonging to the same graph structure included in the target image is distributed so as to correspond to a topological distance which is a distance on a route of the graph structure.

Figure 3:
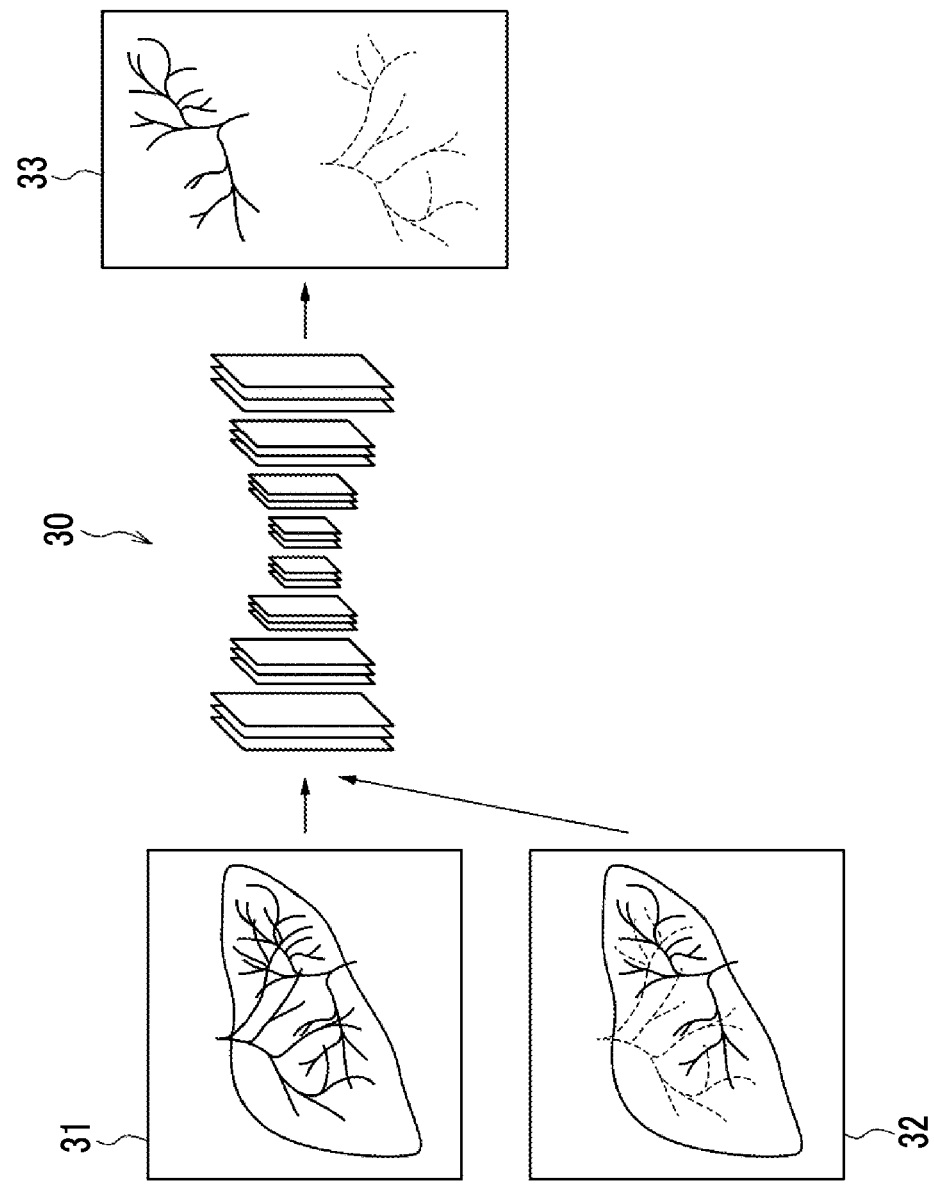
FIG. 3 is a schematic block diagram illustrating a configuration of an extraction model and learning processing.

FIG. 3 is a schematic block diagram illustrating a configuration of the extraction model and learning processing. As shown in FIG. 3, the learning unit 22 makes an extraction model 30 output a feature map for learning 33 in response to an input of an image for learning 31 and ground-truth data 32. The feature map for learning 33 is formed in which the feature vectors of the nodes in the graph structures included in the image for learning 31 are clustered and distributed for each graph structure included in the image for learning 31.

Here, the image for learning 31 includes an artery and a vein included in the liver. Further, the ground-truth data 32 is data in which the graph structures of the artery and the vein included in the image for learning 31 are distinguished from each other. In the ground-truth data 32 shown in FIG. 3, the graph structure of the artery is shown by a solid line and the graph structure of the vein is shown by a broken line, so that the artery and the vein are distinguished from each other. Further, in the feature map for learning 33 shown in FIG. 3, the distribution of the feature vector in the graph structure of the artery is shown by a solid line, and the distribution of the feature vector in the graph structure of the vein is shown by a broken line.

The extraction model 30 consists of a convolutional neural network (hereinafter, referred to as a CNN), which is one of multi-layer neural networks in which a plurality of processing layers are hierarchically connected. Further, since all the input layers of the processing layer of the CNN are convolutional layers, the CNN is a fully convolutional neural network. The convolutional layer performs convolution processing using various kernels on an image that is input, and outputs a feature map consisting of feature amount data obtained by the convolution processing. The kernel has an n×n pixel size (for example, n=3), and each element is weighted. Specifically, weight such as a differential filter by which the edge of the input image is weighted is set. The convolutional layer applies the kernel to the entire input image or feature map output from the previous processing layer, while shifting the pixel of interest of the kernel. Furthermore, the convolutional layer applies an activation function such as a sigmoid function to the convolution value, and outputs a feature map.

In the present embodiment, the learning unit 22 makes the extraction model 30 output the feature map for learning 33 for the image for learning 31 in a case where the image for learning 31 and the ground-truth data 32 representing the extraction result of nodes of the plurality of graph structures included in the image for learning 31 are input to the extraction model 30. In the present embodiment, the extraction model 30 generates the feature map for learning 33 such that the feature vector distance between nodes belonging to the same graph structure included in the image for learning 31 corresponds to the topological distance which is a distance on the route of the graph structure. Further, in the present embodiment, the feature map for learning 33 is generated such that the feature vector distance between nodes belonging to the same graph structure is decreased and the feature vector distance between nodes belonging to the different graph structures is increased.

Therefore, the learning unit 22 derives, on the basis of the distribution of a plurality of feature vector groups in the feature map for learning 33 and the ground-truth data 32, a loss L between nodes on the graph structure in the image for learning 31 on the basis of the error between the feature vector distance between nodes belonging to the same graph structure included in the image for learning 31 and the topological distance which is a distance on the route of the graph structure between nodes. The learning unit 22 derives the loss L such that the feature vector distance between pixels belonging to the same graph structure is decreased and for the feature vectors between nodes belonging to the different graph structures, the distance between feature vectors is increased.

Figure 4:
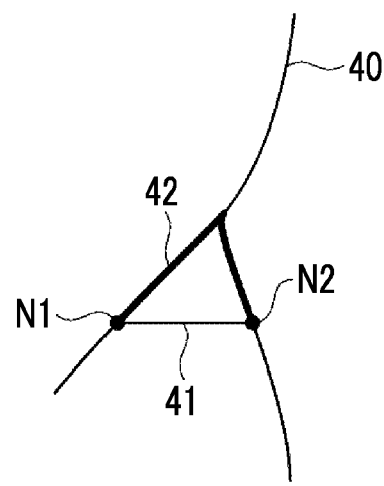
FIG. 4 is a diagram illustrating a topological distance.

Here, the topological distance will be described. FIG. 4 is a diagram illustrating the topological distance. As shown in FIG. 4, the distance between two nodes N1 and N2 on the graph structure 40 having one branch is considered. The Euclidean distance between the two nodes N1 and N2 is the length of the straight line 41 connecting the two nodes N1 and N2. On the other hand, the topological distance is the distance on the route of the graph structure 40, with respect to the two nodes N1 and N2 in the same graph structure 40. In a case of the graph structure 40 shown in FIG. 4, the length on the route of the graph structure 40 shown by the thick line which exists between the nodes N1 and N2 is a topological distance 42 of the nodes N1 and N2.

Figure 5:
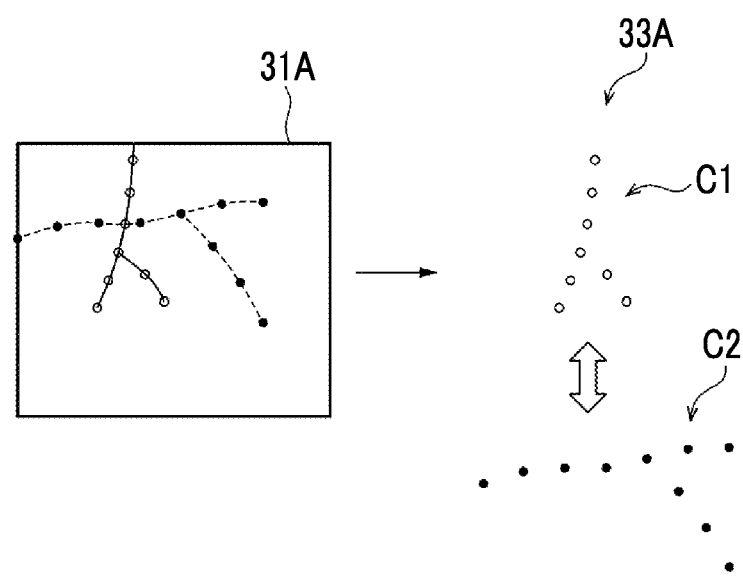
FIG. 5 is a conceptual diagram of generation of a feature map.

FIG. 5 is a conceptual diagram of the generation of the feature map. FIG. 5 shows the generation of a partial feature map 33A for each of the artery and the vein included in a partial region 31A of the image for learning 31. Further, in the partial region 31A, the nodes on the graph structure of the artery shown by the solid line are shown by white circles and the nodes on the graph structure of the vein shown by the broken line are shown by black circles, and in the partial feature map 33A, the feature vector of the nodes on the graph structure of the artery is shown by white circles and the feature vector of the nodes on the graph structure of the vein is shown by black circles. As shown in FIG. 5, in the present embodiment, the feature map is generated such that the distance between the nodes belonging to the same graph structure corresponds to the topological distance which is the distance on the route of the graph structure. Further, in the present embodiment, the feature map is generated such that the feature vector distance between the nodes belonging to different graph structures is apart as shown by the double-headed arrows in FIG. 5. Accordingly, the feature vectors to which the topological distance between nodes is reflected in the feature space are distributed. Further, the feature vectors are clustered into a cluster C1 consisting of the nodes with white circles and a cluster C2 consisting of the nodes with black circles, and are distributed.

Here, the loss L is represented by Equation (1), and a function F is represented by Equation (2). In Equation (1), in all the samples, that is, all the nodes on the graph structure, the loss L in a relationship with a plurality of nodes j included in a predetermined range Ni adjacent to a node i is derived. This is to reduce the amount of operation for learning and graph structure extraction, which will be described later, and to efficiently perform the operation for learning and graph structure extraction. The size of the range Ni may be appropriately set according to the processing capacity of the apparatus. The derivation of the loss L is not limited to the range Ni adjacent to the node i, and may be applied to all the nodes. Here, "same graph" in Equation (2) indicates a case where i and j belong to the same graph structure, and "different graph" indicates a case where i and j belong to different graph structures from each other. In the function F represented by Equation (2), the error between the feature vector distance between the nodes and the topological distance which is the distance on the route of the graph structure between the nodes is derived, for the nodes belonging to the same graph structure. Further, the feature vector distance between the nodes belonging to the same graph structure is decreased, and for the nodes belonging to the different graph structures, the feature vector distance between the nodes is increased.

$$L = \sum_{i}^{S} \sum_{j \in N_i} F(x_i, x_j) \quad (1)$$

$$F(x_i, x_j) = \{[\|x_i - x_j\| - D_{ij}]^2 \forall i, j \in \text{same graph}, [K - \|x_i - x_j\|]_+^2 \forall i, j \in \text{different graph}\} \quad (2)$$

In Equations (1) and (29, S represents a sample size (the size of all the nodes), xi represents the feature vector of the node i, xj represents the feature vector of the node j included in the range Ni adjacent to the node i, F represents a function regarding the two feature vectors xi and xj, Dij represents the topological distance between the two nodes i and j, K represents a predetermined value, ‖ ‖ represents the distance between feature vectors, and [ ]$_+$ is an operator representing 0 in a case where the value in [ ] is negative and the value in a case where the value in [ ] is positive.

The learning unit 22 derives the number of convolutional layers constituting the extraction model 30, a kernel coefficient, kernel size, and the like, to perform learning of the extraction model 30 so that the loss L is a predetermined threshold value or less. In a case where learning of the extraction model 30 is performed in this way, a learned extraction model 50 that receives an input of a target image and outputs a feature map in which a plurality of tubular structures (in the present embodiment, the artery and the vein) included in the target image are distributed in a state in which the feature vector distance between nodes belonging to the same graph structure corresponds to the topological distance which is a distance on the route of the graph structure, the feature vector distance between nodes belonging to the same graph structure is decreased, and the feature vectors of nodes belonging to the different graph structures are apart from each other is constructed. The learned extraction model 50 is applied to the graph structure extraction unit 23.

Figure 6:
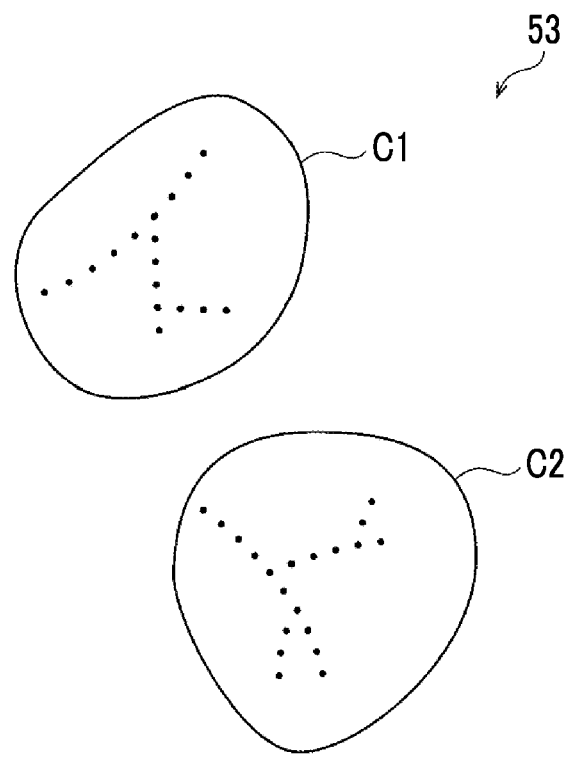
FIG. 6 is a diagram schematically showing a feature map that is output from a learned extraction model.

FIG. 6 is a diagram schematically showing a feature map that is output from the learned extraction model 50. In FIG. 6, the feature map 53 of the two-dimensional feature space is shown assuming that the feature vector is two-dimensional, but the feature map 53 is actually output in the feature space of the dimension corresponding to the dimension of the feature vector. Further, in FIG. 6, a region surrounded by the solid line represents a cluster of nodes having a graph structure, and the points in the cluster represent the feature vector of the nodes having a graph structure. In the feature map 53 shown in FIG. 6, the feature vectors of nodes of the different graph structure are grouped in two clusters C1 and C2 in the feature space, and the two clusters C1 and C2 are distributed so as to be apart from each other. This represents that the target image includes two tubular structures (that is, the artery and the vein) and that the nodes of the graph structures of the two tubular structures are segmented. Further, in the clusters C1 and C2, the feature vectors are distributed in a state in which the topological distance between the nodes of the graph structure in the target image is reflected thereto. This represents that the feature vector of the nodes of the graph structure is distributed in a state where the continuity of the graph structure including a branch and the like in the nodes is maintained.

In a case where the target image is input, the graph structure extraction unit 23 extracts the graph structures of two tubular structures, an artery and a vein, from the target image by using the learned extraction model 50. That is, the graph structure extraction unit 23 makes the learned extraction model 50 output a feature map in which the feature vectors of nodes of the graph structures of the tubular structures included in the target image are distributed, in a case where the target image is input to the learned extraction model 50. Then, the graph structure extraction unit 23 connects the nodes of the extracted graph structure so as not to have a closed circuit. At this time, nodes having a short feature vector distance therebetween are sequentially connected on the basis of the feature map. As a result, the graph structure extraction unit 23 extracts the graph structure from the target image.

Figure 7:
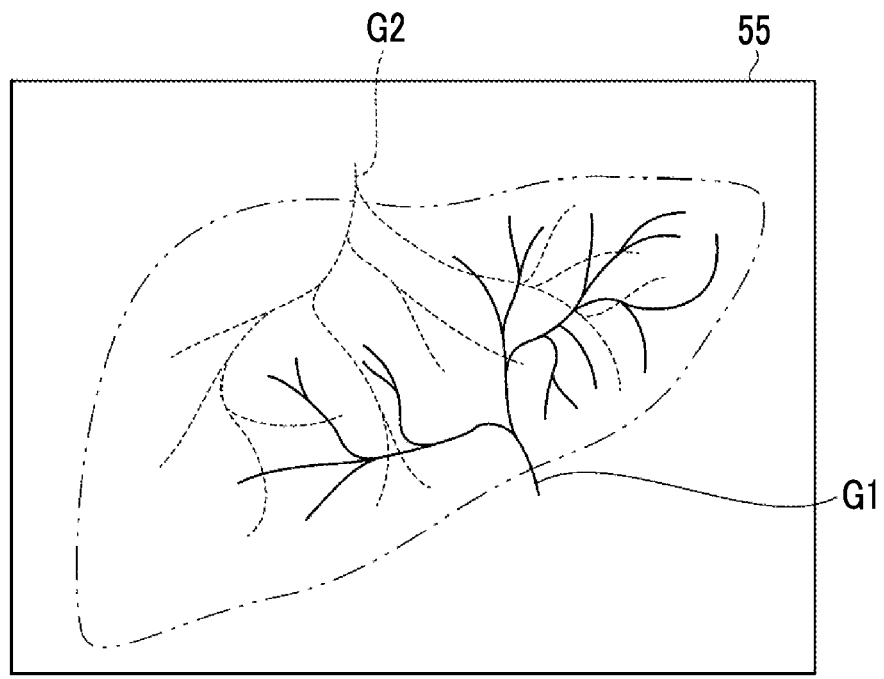
FIG. 7 is a diagram illustrating extraction of a graph structure.

For example, in a case where a target image 55 including the liver is input to the graph structure extraction unit 23, the graph structure extraction unit 23 extracts graph structures G1 and G2 of the artery and the vein in the liver included in the target image 55, as shown in FIG. 7. In FIG. 7, the graph structure of the artery is shown by the solid line, and graph structure of the vein is shown by the broken line.

Figure 8:
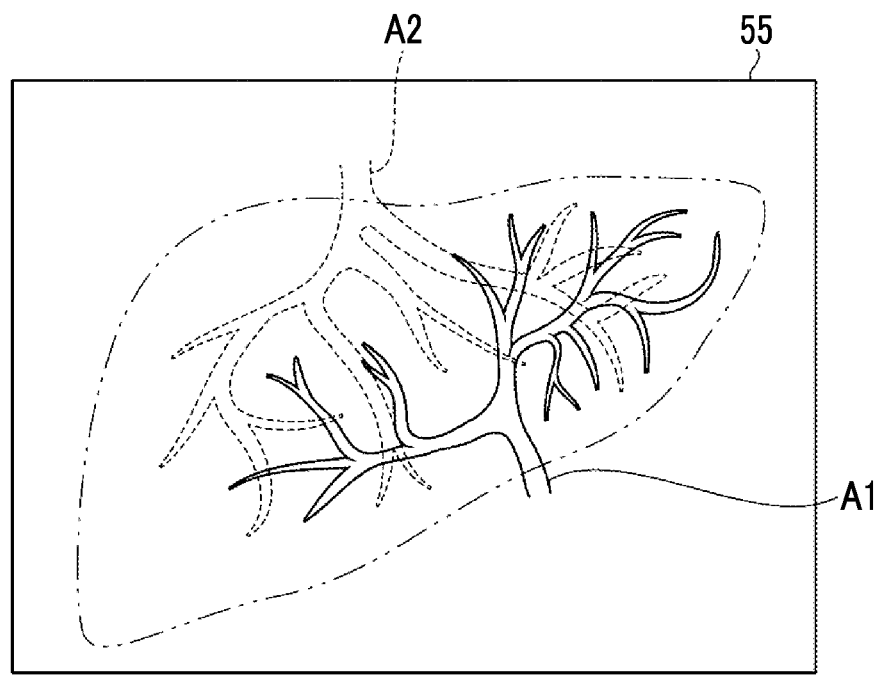
FIG. 8 is a diagram showing a labeled target image.

The labeling unit 24 labels the tubular structures included in the target image 55 on the basis of the graph structure extraction result output by the graph structure extraction unit 23. For example, in a case where the graph structures G1 and G2 of the artery and the vein in the liver are extracted as shown in FIG. 7, the labeling unit labels regions consisting of pixels having the same signal values as nodes of the graph structures G1 and G2 in the target image 55 as an arterial region A1 and a venous region A2, respectively, as shown in FIG. 8. The arterial region A1 and the venous region A2 may be labeled with different labels from each other. In FIG. 8, the arterial region A1 is labeled with a solid line label given to the contour of the artery and the venous region A2 is labeled with a broken line label given to the contour of the vein, in the target image 55. The labeling may be performed by giving the artery and the vein different colors or hatching.

The display control unit 25 displays the labeled target image 55 on the display unit 14.

Figure 9:
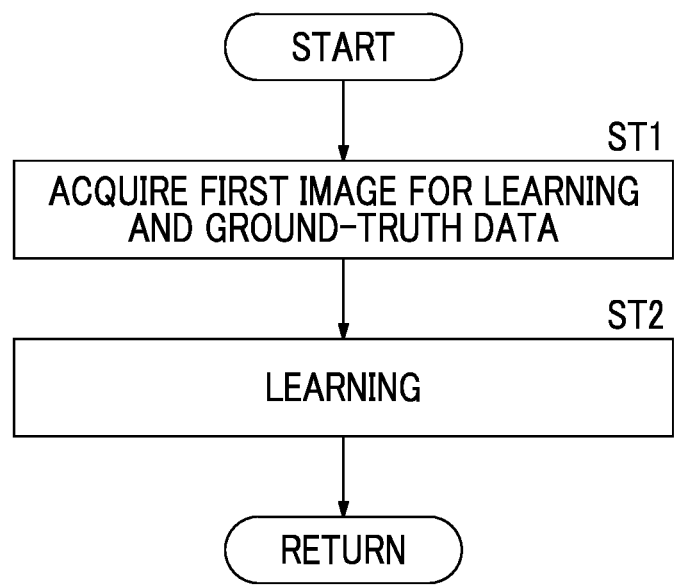
FIG. 9 is a flowchart showing learning processing performed in the present embodiment.

Next, processing performed in the present embodiment will be described. FIG. 9 is a flowchart showing learning processing performed in the present embodiment. It is assumed that the image for learning and the ground-truth data are acquired by the image acquisition unit 21 from the image storage server 3 and are stored on the storage 13. First, the learning unit 22 acquires a set of the image for learning and the ground-truth data from among a plurality of images for learning and ground-truth data stored on the storage 13 (Step ST1). The learning unit 22 makes the extraction model 30 output the feature map for learning 33 in response to the input of the image for learning 31 and the ground-truth data 32, and derives the loss L. Then, the learning unit 22 performs learning of the extraction model 30 so that the loss L becomes a predetermined threshold value or less (Step ST2).

Then, the process returns to Step ST1, a next image for learning 31 and ground-truth data 32 are acquired from the storage 13, and the processing of Steps ST1 and ST2 is repeated. As a result, the learned extraction model 50 is constructed.

The learning unit 22 repeats learning until the loss L becomes a predetermined threshold value or less, but may repeat learning a predetermined number of times.

Figure 10:
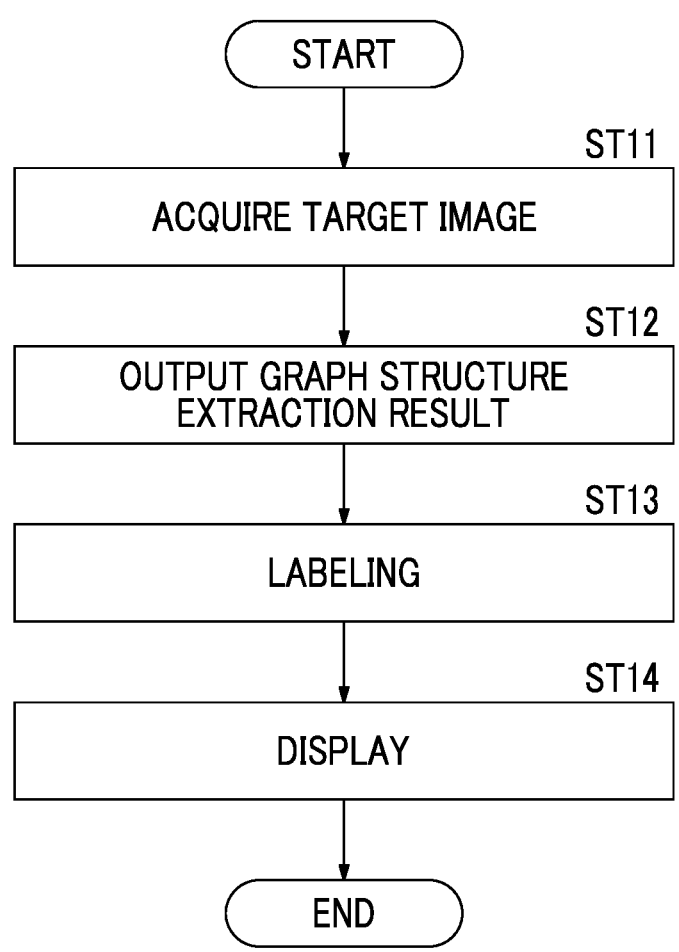
FIG. 10 is a flowchart showing graph structure extraction processing performed in the present embodiment.

Next, graph structure extraction processing performed in the present embodiment will be described. FIG. 10 is a flowchart of graph structure extraction processing performed in the present embodiment. The image acquisition unit 21 acquires the target image (Step ST11), and the graph structure extraction unit 23 outputs the graph structure extraction result included in the target image 55 (Step ST12). Next, the labeling unit 24 labels the tubular structure, on the basis of the graph structure extracted from the target image 55 on the basis of the graph structure extraction result (Step ST13). Then, the display control unit 25 displays the labeled target image on the display unit 14 (Step ST14), and the processing ends.

As described above, in the present embodiment, in a case where the graph structure of the tubular structure included in the target image is extracted, the feature map in which the feature vector distance between nodes belonging to the same graph structure corresponds to the topological distance which is a distance on the route of the graph structure is output by the learned extraction model 50 to which the target image is input, and the graph structure is extracted from the target image. For this reason, in a case where the topological distance in the graph structure is reflected, the graph structure can be extracted from the target image in a state in which the continuity of the graph structure including the branch and the like is maintained. Therefore, according to the present embodiment, the graph structure can be accurately extracted from the target image.

Further, in a case where for the image for learning including at least two different graph structures, a loss is derived such that the feature vector distance between nodes belonging to the same graph structure is decreased and the feature vector distance between nodes belonging to the different graph structures is increased, a feature map can be output such that the nodes belonging to the different graph structures exist apart from each other in the feature space.

Therefore, the different graph structures included in the target image can be accurately extracted as separate structures.

In the above-described embodiment, each of the plurality of tubular structures included in the target image is labeled, but the present disclosure is not limited thereto. Only a part of the plurality of tubular structures may be labeled.

Further, in the above-described embodiment, the artery and the vein of the liver included in the target image are extracted as a graph structure, but the present disclosure is not limited thereto. The technique of the present disclosure can also be applied to a case where the graph structure of the portal vein is extracted in addition to the artery and the vein of the liver. In this case, the ground-truth data for the image for learning is data in which the artery, the vein, and the portal vein are distinguished from each other. The technique of the present disclosure can also be applied to a case where the graph structures of the artery and vein of the lung, as well as the bronchus, artery, and vein of the lung, in addition to the bronchus of the lung are extracted.

In addition, in the above-described embodiment, the three-dimensional medical image is used as the target image, but the present disclosure is not limited thereto. Individual tomographic images constituting a three-dimensional medical image may be used as the target image. Further, a two-dimensional X-ray image acquired by simple X-ray imaging may be used as the target image. In this case, an image for learning corresponding to the type of the target image is prepared, and learning of the extraction model 30 is performed.

Further, in the above-described embodiment, for example, as a hardware structure of a processing unit that executes various processing, such as the image acquisition unit 21, the learning unit 22, the graph structure extraction unit 23, the labeling unit 24, and the display control unit 25, the following various processors may be used. The various processors include, for example, a programmable logic device (PLD), such as a field programmable gate array (FPGA), which is a processor having a changeable circuit configuration after manufacture, and a dedicated electrical circuit, such as an application specific integrated circuit (ASIC), which is a processor having a dedicated circuit configuration designed to perform specific processing, in addition to the CPU, which is a general-purpose processor that executes software (programs) to function as various processing units, as described above.

One processing unit may be constituted of one of the various processors or may be constituted of a combination of two or more processors of the same type or different types (for example, a combination of a plurality of FPGAs and a combination of a CPU and an FPGA). Further, the plurality of processing units may constitute one processor.

A first example of the configuration in which the plurality of processing units are constituted of one processor is an aspect in which one or more CPUs and software are combined to constitute one processor and the processor functions as a plurality of processing units. A representative example of the aspect is a computer such as a client and server. A second example of the configuration is an aspect in which a processor that implements all of the functions of a system including the plurality of processing units with one integrated circuit (IC) chip is used. A representative example of the aspect is a system on chip (SoC). As described above, as the hardware structure of various processing units, one or more of the various processors are used.

Furthermore, as the hardware structure of the various processors, more specifically, an electrical circuit (circuitry) in which circuit elements, such as semiconductor elements, are combined may be used.

What is claimed is:

1. A learning apparatus comprising:
    at least one processor, wherein the processor is configured to:
        input a learning image and ground-truth data of the learning image to an extraction model, wherein the ground-truth data of the learning image comprises an extraction result of nodes of a graph structure included in the learning image;
        receive a feature map for learning outputted from the extraction model such that a feature vector distance between nodes belonging to a same graph structure included in learning image corresponds to a topological distance which is a distance on a route of the graph structure between the nodes;
        derive, according to the feature map for learning and the ground-truth data for learning, a loss between the nodes on the graph structure included in the learning image on the basis of a difference between the feature vector distance and the topological distance; and
        perform learning of the extraction model on the basis of the loss.

2. The learning apparatus according to claim 1, wherein the processor is configured to further derive, for another learning image including at least two different graph structures, a loss such that a feature vector distance between nodes belonging to a same graph structure in the another learning image is decreased.

3. The learning apparatus according to claim 2, wherein the processor is configured to further derive the loss such that a feature vector distance between nodes belonging to different graph structures in the another learning image is increased.

4. The learning apparatus according to claim 1, wherein the extraction model is a fully convolutional neural network.

5. The learning apparatus according to claim 1, wherein the target image and the image for learning are three-dimensional medical images.

6. The learning apparatus according to claim 1, wherein the tubular structure is an artery and a vein.

7. The learning apparatus according to claim 1, wherein the tubular structure is an artery, a vein, and a portal vein in a liver.

8. The learning apparatus according to claim 1, wherein the tubular structure is a bronchus.

9. A graph structure extraction apparatus comprising:
    at least one processor, wherein the processor is configured to:
        acquire a target image including at least one tabular structure;
        input the target image into the extraction model learned by the learning apparatus according to claim 1; and
        receive an extraction result of a graph structure of the tabular structure included in the target image.

10. The graph structure extraction apparatus according to claim 9, wherein the processor is further configured to;
    label the tubular structure included in the target image according to the extraction result of the graph structure; and
    display the target image in which the tubular structure is labeled, on a display.

11. A learning method comprising:
inputting a learning image and ground-truth data of the learning image to an extraction model, wherein the ground-truth data of the learning image comprises an extraction result of nodes of a graph structure included in the learning image;
receiving a feature map for learning outputted from the extraction model such that a feature vector distance between nodes belonging to a same graph structure included in learning image corresponds to a topological distance which is a distance on a route of the graph structure between the nodes;
deriving, according to the feature map for learning and the ground-truth data for learning, a loss between the nodes on the graph structure included in the learning image on the basis of a difference between the feature vector distance and the topological distance; and
performing learning of the extraction model on the basis of the loss.

12. A graph structure extraction method comprising:
acquiring a target image including at least one tabular structure;
inputting the target image into the extraction model learned by the learning method according to claim 11; and
receiving an extraction result of a graph structure of the tabular structure included in the target image.

13. A non-transitory computer-readable storage medium that stores a graph structure extraction program causing a computer to execute a process comprising:
acquiring a target image including at least one tabular structure;
inputting the target image into the extraction model learned by the learning method according to claim 11; and
receiving an extraction result of a graph structure of the tabular structure included in the target image.

14. A non-transitory computer-readable storage medium that stores a learning program causing a computer to execute a process comprising:
inputting a learning image and ground-truth data of the learning image to an extraction model, wherein the ground-truth data of the learning image comprises an extraction result of nodes of a graph structure included in the learning image;
receiving a feature map for learning outputted from the extraction model such that a feature vector distance between nodes belonging to a same graph structure included in learning image corresponds to a topological distance which is a distance on a route of the graph structure between the nodes;
deriving, according to the feature map for learning and the ground-truth data for learning, a loss between the nodes on the graph structure included in the learning image on the basis of a difference between the feature vector distance and the topological distance; and
performing learning of the extraction model on the basis of the loss.

* * * * *